(12) United States Patent
Aomori et al.

(10) Patent No.: US 10,920,139 B2
(45) Date of Patent: Feb. 16, 2021

(54) PHOSPHOR LAYER COMPOSITION, PHOSPHOR MEMBER, LIGHT SOURCE DEVICE, AND PROJECTION DEVICE

(71) Applicant: SHARP KABUSHIKI KAISHA, Sakai (JP)

(72) Inventors: Shigeru Aomori, Sakai (JP); Hideomi Yui, Sakai (JP); Mutsuko Yamamoto, Sakai (JP); Hidetsugu Matsukiyo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/626,512

(22) PCT Filed: Jun. 22, 2018

(86) PCT No.: PCT/JP2018/023734
§ 371 (c)(1),
(2) Date: Dec. 24, 2019

(87) PCT Pub. No.: WO2019/004064
PCT Pub. Date: Jan. 3, 2019

(65) Prior Publication Data
US 2020/0239770 A1 Jul. 30, 2020

(30) Foreign Application Priority Data
Jun. 30, 2017 (JP) ................. 2017-129900

(51) Int. Cl.
| | | |
|---|---|---|
| C09K 11/02 | (2006.01) | |
| C09K 11/77 | (2006.01) | |
| G03B 21/20 | (2006.01) | |
| G02B 1/11 | (2015.01) | |
| G02B 26/00 | (2006.01) | |

(52) U.S. Cl.
CPC .......... *C09K 11/7774* (2013.01); *C09K 11/02* (2013.01); *G03B 21/204* (2013.01); *G02B 1/11* (2013.01); *G02B 26/008* (2013.01)

(58) Field of Classification Search
CPC .. C09K 11/7774; C09K 11/02; G03B 21/204; G02B 1/11; G02B 26/008
See application file for complete search history.

(56) References Cited

U.S. PATENT DOCUMENTS

| | | | | |
|---|---|---|---|---|
| 5,923,118 | A * | 7/1999 | Jennato | C09K 11/7774 313/485 |
| 6,963,457 | B1 * | 11/2005 | Niwa | G02B 26/008 348/743 |
| 7,811,684 | B2 | 10/2010 | Yamada et al. | |
| 7,931,936 | B2 | 4/2011 | Yamada et al. | |
| 8,501,270 | B2 | 8/2013 | Yamada et al. | |
| 8,922,111 | B2 | 12/2014 | Zhang et al. | |
| 9,246,131 | B2 * | 1/2016 | Thoumazet | C23C 16/345 |
| 9,287,469 | B2 | 3/2016 | Chakraborty | |
| 2005/0233113 | A1 * | 10/2005 | Kotani | C03C 1/008 428/141 |
| 2006/0188666 | A1 | 8/2006 | Ota | |
| 2006/0199040 | A1 | 9/2006 | Yamada et al. | |
| 2009/0021851 | A1 * | 1/2009 | Janicek | G02B 26/008 359/892 |
| 2009/0081361 | A1 | 3/2009 | Yamada et al. | |
| 2009/0243467 | A1 * | 10/2009 | Shimizu | C09K 11/7734 313/503 |
| 2009/0272996 | A1 | 11/2009 | Chakraborty | |
| 2011/0189389 | A1 | 8/2011 | Yamada et al. | |
| 2013/0113365 | A1 * | 5/2013 | Yamasuge | H01L 33/504 313/503 |
| 2013/0234587 | A1 * | 9/2013 | Zhang | C04B 35/63488 313/503 |
| 2013/0256599 | A1 * | 10/2013 | Irie | C04B 35/6261 252/301.4 R |
| 2014/0226306 | A1 * | 8/2014 | Khan | H04N 9/3158 362/84 |
| 2015/0116671 | A1 * | 4/2015 | Kuroi | G03B 21/204 353/84 |
| 2015/0219799 | A1 | 8/2015 | Sonoda et al. | |
| 2015/0378058 | A1 * | 12/2015 | Sonoda | G02B 1/113 359/601 |
| 2015/0381953 | A1 * | 12/2015 | Egawa | H04N 9/3158 353/31 |
| 2016/0061996 | A1 * | 3/2016 | Ishimatsu | G02B 1/113 359/586 |
| 2016/0091712 | A1 * | 3/2016 | Egawa | G03B 21/204 353/31 |
| 2016/0274353 | A1 | 9/2016 | Ando et al. | |
| 2017/0219171 | A1 * | 8/2017 | Sorg | F21K 9/64 |
| 2017/0244939 | A1 * | 8/2017 | Arakawa | F21V 29/502 |

FOREIGN PATENT DOCUMENTS

| | | |
|---|---|---|
| JP | 5227252 B2 | 7/2013 |
| JP | 2015-163715 A | 9/2015 |
| JP | 2015-232130 A | 12/2015 |
| JP | 2016-018110 A | 2/2016 |
| JP | 2006-259711 A | 9/2016 |
| WO | 2014/061237 A1 | 4/2014 |
| WO | 2015/072319 A1 | 5/2015 |
| WO | 2017/098730 A1 | 6/2017 |

\* cited by examiner

*Primary Examiner* — Donald L Raleigh
(74) *Attorney, Agent, or Firm* — ScienBiziP, P.C.

(57) ABSTRACT

A phosphor layer composition, phosphor member, light source device, and projection device are provided that are capable of restraining reflection or scattering at interfaces between phosphor particles and a binder to improve the excitation-light absorption by, and the external quantum efficiency of, the phosphor particles. The present invention, in an aspect thereof, is directed to a phosphor layer composition including: phosphor particles 111 absorbing excitation light and emitting prescribed fluorescence; and a binder 112 composed of a translucent gel containing a metal alkoxide or a mixture of a metal alkoxide and a metal oxide, wherein the phosphor particles 111 are dispersed in the binder 112, and the phosphor particles 111 and the binder 112 differ in refractive index by 0.3 or less.

8 Claims, 14 Drawing Sheets

PHOSPHOR LAYER COMPOSITION, PHOSPHOR MEMBER, LIGHT SOURCE DEVICE, AND PROJECTION DEVICE

TECHNICAL FIELD

The present invention relates to phosphor layer compositions that function under excitation light and also to phosphor members, light source devices, and projection devices using such a phosphor layer composition.

BACKGROUND ART

Phosphors that emit light in response to laser irradiation have been conventionally used in combination with binders for those materials in projectors and other like apparatus. There exists literature that describes the refractive indices of the materials. Patent Literature 1, as an example, describes a light-emitting device for a projector using a phosphor wheel including on a transparent substrate a phosphor layer including: an inorganic binder, and a phosphor dispersed in the inorganic binder. The inorganic binder is formed by a sol-gel process. There is a difference of 0.4 or less between the refractive indices of the transparent substrate and the inorganic binder.

Patent Literature 2 describes an LED device with a conversion layer including: a binder material and nanoparticles dispersed in the binder material. The nanoparticles are dispersed in the binder material such that the combination of the binder material and the nanoparticles has an effective refractive index that strictly matches the refractive index of phosphor particles.

Technology is also known where alumina is treated in warm water to form a fine structure on the surface in order to adjust the refractive index. Patent Literature 3 describes a lens with a fine structure of alumina hydrate formed on the surface and serving as an antireflective film.

CITATION LIST

Patent Literature

Patent Literature 1: PCT International Application Publication No. WO2015/072319
Patent Literature 2: Japanese Patent No. 5227252
Patent Literature 3: PCT International Application Publication No. WO2014/061237

SUMMARY OF INVENTION

Technical Problem

In the aforementioned apparatus including a phosphor device in which a phosphor fluoresces under high-density excitation light, laser light or like high-energy excitation light is condensed to form a spot of light on a phosphor layer disposed along the circumference of a phosphor wheel. Fluorescence occurs in the irradiated spot area. At the same time, the excitation light is partly converted to thermal energy, heating the irradiated area to high temperature.

A "thermal quenching" phenomenon is known where the light-emitting efficiency of a phosphor falls with rising temperature of the phosphor. Accordingly, the phosphor wheel in optical and projection devices is rotated to move the irradiated area of the phosphor layer, so as to restrict local temperature rises. For fluorescence under more intensive excitation light, however, the rotation of the phosphor wheel alone is not sufficient to properly restrict temperature rises in the area irradiated by the excitation light.

The light-emitting efficiency of phosphor exhibits temperature dependence that also changes with the concentration of the luminescence-center element. FIG. 14 is a graph representing a relationship between the temperature and external quantum efficiency of a phosphor for various concentrations of a luminescence-center element. The concentration of Ce, which is the luminescence-center element in many commercially available YAG:Ce phosphors, is selected so as to achieve a high light-emitting efficiency when used at normal temperature (e.g., approximately 0.03). In such phosphors, the intensity of fluorescence decreases undesirably due to heat generation as detailed in the following, when the intensity of excitation light is increased to improve the intensity of fluorescence.

Undesirable "thermal quenching" occurs where a common phosphor exhibits a decreased light-emitting efficiency when the temperature of the phosphor rises, for example, above 200° C. in a spot area irradiated by high-density, high-intensity excitation light as demonstrated in FIG. 14. Meanwhile, phosphors with a low Ce concentration (e.g., 0.003) have a light-emitting efficiency that exhibits low temperature dependence; the light-emitting efficiency can in some cases be higher at high temperatures than at low temperatures. The phosphor with a low impurity concentration, however, does not absorb much excitation light Therefore, the phosphor with a low Ce concentration, which is not much affected by thermal quenching at high temperatures, has a low external quantum efficiency, failing to achieve a desirable intensity of fluorescence (brightness) as demonstrated in FIG. 14. As detailed here, the phosphor with a low concentration of the luminescence-center element, which is not much affected by, for example, excitation-density dependence and temperature rises, has a problem of low absorption of high-density excitation light.

Common examples of the binder in a phosphor layer include resin materials (typically, silicone resin) and transparent inorganic materials such as polysilazane (inorganic binders). The phosphor layer used is porous in some cases so that air comes into contact with the surroundings of the phosphor.

Garnet-based materials (YAG, LuAG) typically contained in phosphor particles have a high refractive index, n, of approximately 1.8. Meanwhile, silicone resin and other components of the surrounding binder have a refractive index of approximately 1.5. Therefore, this difference in refractive index will cause interfacial reflection at interfaces between the phosphor particles and the binder. The interfacial reflection has non-negligible influence on the excitation light irradiating the phosphor if a phosphor with a low impurity concentration, which has a light-emitting efficiency that exhibits low temperature dependence, is used as described above.

The present invention, in an embodiment thereof, has been made in view of these problems and has an object to provide a phosphor layer composition, a phosphor member, a light source device, and a projection device that are capable of restraining reflection at interfaces between the phosphor particles and the binder to improve the excitation-light absorption by, and the external quantum efficiency of, the phosphor particles.

Solution to Problem

The present invention, in an embodiment thereof, is arranged as follows to achieve the object. Specifically, the present invention, in an embodiment thereof, is directed to a phosphor layer composition including: phosphor particles absorbing excitation light and emitting prescribed fluorescence; and a binder composed of a translucent gel containing a metal alkoxide or a mixture of a metal alkoxide and a metal oxide, wherein the phosphor particles are dispersed in the binder, and the phosphor particles and the binder differ in refractive index by 0.3 or less.

Advantageous Effects of Invention

The present invention, in an embodiment thereof, can restrain reflection at interfaces between the phosphor particles and the binder, thereby improving the excitation-light absorption by, and the external quantum efficiency of, the phosphor particles. As a result, the phosphor particles, although having a low concentration of the luminescence-center element and hence not much influenced by thermal quenching at elevated temperatures, can still achieve intensive fluorescence (high brightness). The use of an inorganic binder also improves the heat resistance of the phosphor layer. Consequently, the decrease in light-emission intensity is restrained at high temperatures.

DESCRIPTION OF EMBODIMENTS

The following will describe embodiments of the present invention with reference to drawings.

First Embodiment

Structure of Phosphor Member

Figure 1A:
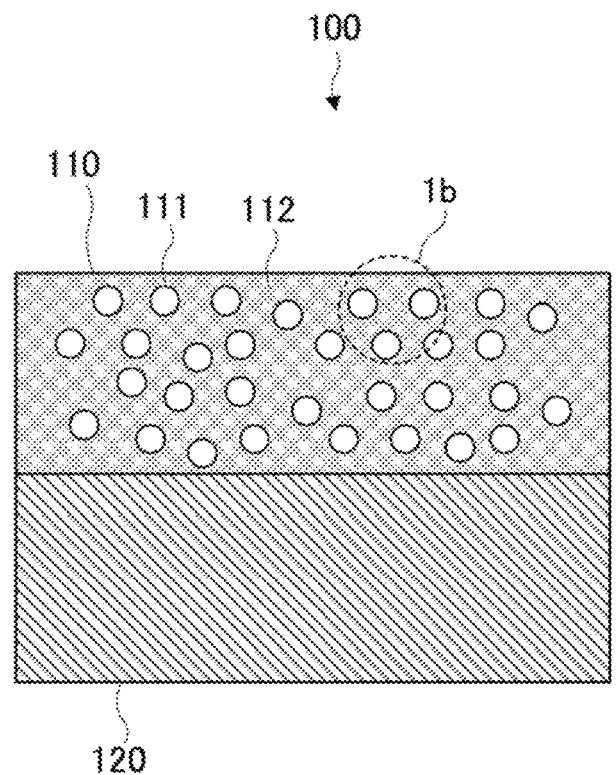
FIG. 1A is a cross-sectional view of a phosphor member in accordance with a first embodiment.
Figure 1B:
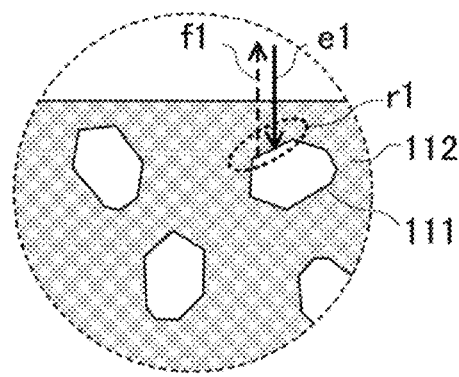
FIG. 1B is a cross-sectional view of a phosphor layer in accordance with the first embodiment.

FIG. 1A is a cross-sectional view of a phosphor member 100. FIG. 1B is a cross-sectional view of a phosphor layer 110. The phosphor member 100 includes the phosphor layer 110 and a base member 120 and is shaped like a plate. The phosphor member 100 is preferably shaped like a circular plate so that an excitation-light spot can be moved easily. The phosphor member 100 is not necessarily a circular plate. The base member 120 is made of a material that reflects light such as aluminum to be reflective or a material that transmits light such as glass or sapphire to be transmissive. The base member 120, if being reflective, may include a light-transmitting material and a reflective film provided on the surface of the light-transmitting material, the reflective film being composed of a reflective material. The phosphor layer 110 is provided on the surface of the base member 120. The phosphor layer 110, being composed of a phosphor layer composition (detailed later), exhibits am improved external quantum efficiency while restraining influence of elevated temperatures of the phosphor member 100 under excitation light.

Referring to FIG. 1A, the phosphor layer composition contains phosphor particles 111 and a binder 112. The phosphor particles 111 is dispersed in the binder 112. The phosphor particles 111 absorb part of excitation light e1 incident to the phosphor layer 110 and emit prescribed fluorescence f1 as shown in FIG. 1B. The binder 112 is composed of a translucent gel containing a metal alkoxide or a mixture of a metal alkoxide and a metal oxide.

The binder 112 is selected such that the refractive indices of the phosphor particles 111 and the binder 112 differ by 0.3 or less. Use of an inorganic binder with a refractive index that hardly differs from that of the phosphor particles 111 can restrain reflection at interfaces between the phosphor particles 111 and the binder 112 and can also improve the excitation-light absorption by, and the external quantum efficiency of, the phosphor particles. The refractive indices of the phosphor particles 111 and the binder 112 more preferably differ by 0.2 or less.

As a result, the phosphor particles 111, although having a low concentration of the luminescence-center element and hence not much influenced by elevated temperatures, can still achieve intensive fluorescence (high brightness). The use of an inorganic binder also improves the heat resistance of the phosphor layer 110. Consequently, the decrease in light-emission intensity is restrained at high temperatures.

The phosphor particles 111 contain a garnet-based material with alumina as the base material. Examples of the garnet-based material include YAG:Ce (yellow phosphor) and LuAG (green phosphor). These materials have a refractive index, n, of approximately 1.8. The phosphor particles 111 are composed of a material of the general formula $(RE_{1-x}Ce_x)_3Al_5O_{12}$. RE preferably contains at least one element selected from the group consisting of rare-earth elements. The concentration, x, of luminescence-center element Ce to rare earth RE is preferably from 0, exclusive, to 0.03, inclusive. Intensive fluorescence (high brightness) is still achieved when the phosphor particles have a low concentration of the luminescence-center element in this manner. The notation of the concentration of the luminescence-center element will be described later in detail.

The binder 112 is a translucent gel composed of a metal alkoxide or a mixture of a metal alkoxide and a metal oxide. Examples of the metal in the metal alkoxide or metal oxide include silicon, aluminum, tin, zinc, zirconium, and titanium. Among these examples, aluminum, tin, and zinc preferably form oxides with a refractive index of approximately from 1.7 to 2.0. Therefore, the refractive indices of these compounds differ from those of YAG:Ce and LuAG:Ce by 0.2 or less. The binder 112 is hence preferably composed of a metal alkoxide or a mixture of a metal alkoxide and a metal oxide with the metal being primarily any of these examples. Alumina has a thermal conductivity of 30 W/m·K, and zinc oxide has a thermal conductivity of 25.2 W/m·K. These materials are preferred in view of their thermal conductivity.

The binder 112 is more preferably composed of aluminum alkoxide or a mixture of aluminum alkoxide and alumina because these materials contain the same base material (i.e., primarily alumina, among these example metals) as do YAG and other like phosphors.

The term, "primarily," indicates that the gel may be a mixture as long as the gel has an overall refractive index that differs from that of YAG:Ce or LuAG:Ce by 0.3 or less. This composition of the binder 112 can reduce the difference between the refractive indices of the phosphor particles 111 and the binder 112.

Matching the refractive indices of the phosphor particles 111 and the binder 112 by using, as an inorganic binder, a sol-gel based material primarily containing alumina, which has practically the same refractive index (approximately 1.76) as the material for the phosphor particles 111, in order to reduce the difference between the refractive indices of the phosphor particles 111 and the binder 112, in particular reduces interfacial reflection f1 between the material for the phosphor particles 111 and the binder 112 and improves the absorption of excitation light e1 by the phosphor particles 111. This restraining of reflection of light at the interfaces between the phosphor particles 111 and the binder 112 can improve the absorption of excitation light by the phosphor particles 111.

Interfacial Reflectance

The excitation light perpendicularly incident to the phosphor particle 111 via the binder 112 is reflected off the interface in accordance with their refractive indices as shown in region r1 in FIG. 1B. Since the inorganic phosphor has a high refractive index of approximately 1.8, the interfacial reflectance is approximately 0.98% if the binder 112 is replaced by a silicone binder or a silica-based inorganic binder. If the phosphor particles 111 were common phosphor particles with a high impurity concentration, interfacial reflection would reduce incoming excitation light, whereas the phosphor particles would be capable of absorbing more excitation light. This mechanism would lead to sufficient fluorescence.

In contrast, the phosphor particles 111, which have a low impurity concentration, are capable of absorbing less excitation light. Interfacial reflection therefore causes a non-negligible decrease in incoming excitation light, hence a non-negligible decrease in absorbed excitation light. A sufficient level of fluorescence intensity is difficult to achieve. When a material that has a refractive index close to that of the phosphor particles 111 such as an alumina gel is used as the binder 112, the interfacial reflectance falls to approximately 1/25 times those of the silicone- and silica-based binders, so that more excitation light can enter the phosphor without being reflected off the particle-binder interfaces. As a result, more excitation light is absorbed, and more fluorescence occurs.

Notation of Concentration of Luminescence-Center Element

The present invention describes, as examples, the phosphors that are generally written simply as YAG and LuAG The concentration of the luminescence-center element in these materials are written according to the following definition.

A yellow phosphor, YAG:Ce, basically contains four elements: yttrium (Y), aluminum (Al), oxygen (O), and cerium (Ce). A yellowish-green phosphor, LuAG:Ce, is an equivalent of YAG:Ce with all Y atoms being replaced by lutetium (Lu) atoms. Some of the Y atoms are replaced by atoms of another rare-earth element, and some of the Al atoms are replaced by Ga atoms or atoms of another element in the same group, for example, for the purpose of intentionally altering the color of luminescence. Besides the luminescence-center element (Ce), a suitable amount is often introduced as a coactivator into crystals, for example, for the purpose of improving the light-emitting efficiency.

Figure 2:
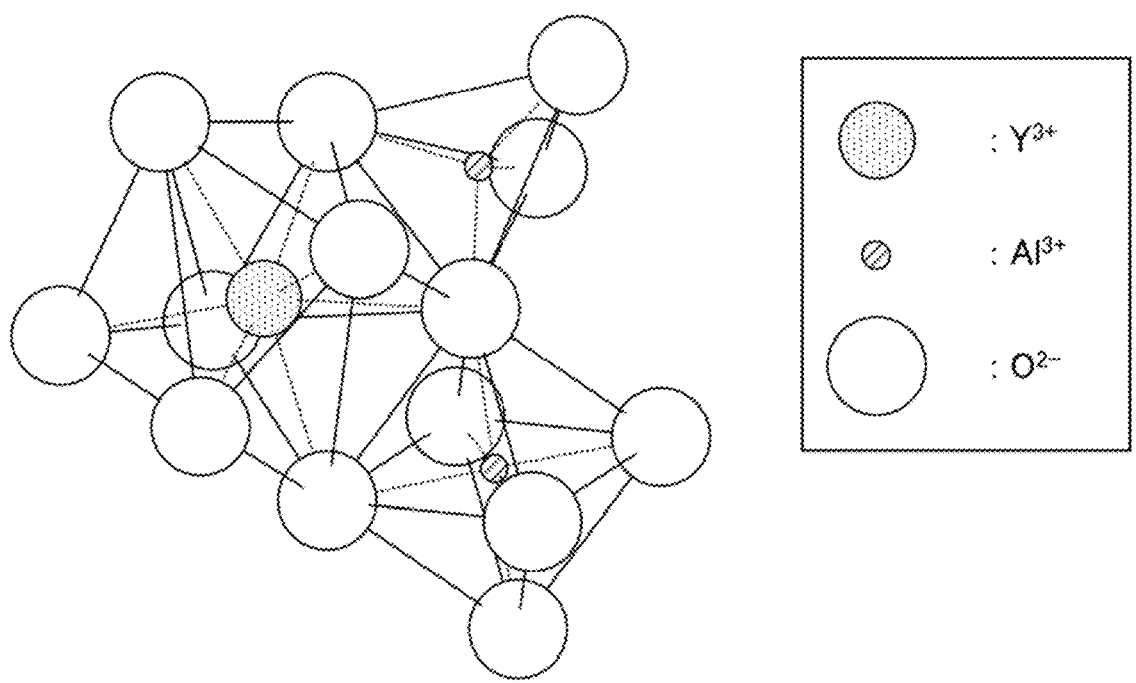
FIG. 2 is a diagram of a crystal structure of YAG ($Y_3Al_5O_{12}$).

FIG. 2 is a diagram of a crystal structure of YAG ($Y_3Al_5O_{12}$). YAG is a crystal with a garnet structure shown in FIG. 2 and has a chemical formula of $Y_3Al_5O_{12}$. YAG is believed to be most stable when the Y atoms are at sites where their coordination numbers are 8, and the Al atoms are at sites where their coordination numbers are 4 or 6. Ce atoms (luminescence-center element) substitute some of the Y atoms that have the most similar size.

When the concentration, x, of luminescence-center element Ce is regarded as a replacement ratio of Y atoms, a YAG phosphor activated by Ce has a general formula of $(Y_{1-x}Ce_x)_3Al_5O_{12}$. As an example, if x=0.030, the ratio of Ce sites to Y and Ce sites is defined as "3.0 mol %" in the present invention.

A similar definition applies to LuAG, where $(Lu_{1-y}Ce_y)_3Al_5O_{12}$ is a general formula, and the ratio of Ce sites to Lu and Ce sites is defined as " . . . mol %."

Phosphor Device

Figure 3A:
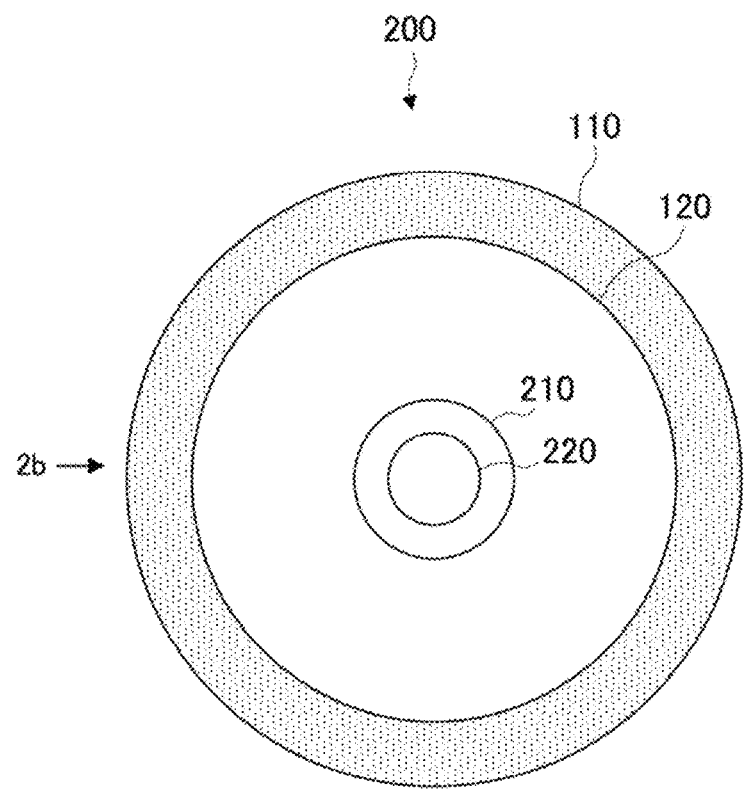
FIG. 3A is a front view of a phosphor device in accordance with the first embodiment.
Figure 3B:
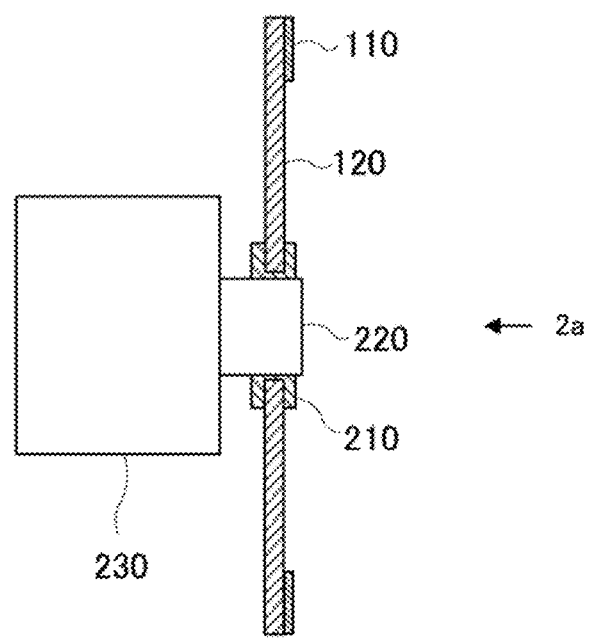
FIG. 3B is a cross-sectional view of the phosphor device in accordance with the first embodiment as viewed sideways.

FIGS. 3A and 3B are a front view and a cross-sectional view, respectively, of a phosphor device 200. FIG. 3A is drawn as the phosphor device 200 is viewed from the direction indicated by arrow 2a in FIG. 3B, whereas FIG. 3B is drawn as the phosphor device 200 is viewed from the direction indicated by arrow 2b in FIG. 3A. Referring to FIG. 3A, the phosphor device 200 includes the phosphor member 100 (phosphor wheel), a fixing member 210, a rotation shaft 220, and a drive unit 230 (electric motor). This phosphor device 200 is used, for example, as a fluorescence light-emitting device for a projector.

In the example shown in FIGS. 3A and 3B, the base member 120 is shaped like a circular plate with hole through its center. The phosphor layer 110 is provided along the periphery of the circular plate. Light is extracted when the phosphor layer 110 irradiated by excitation light. The extracted light may be fluorescence alone in some applications and may be a combination of fluorescence and excitation light in other applications.

The fixing member 210 is for fixing the circular, plate-like phosphor member 100 to the rotation shaft 220 and is preferably made of metal. The fixing member 210 fixes the phosphor member 100 by squeezing the phosphor member 100 in its thickness direction along the periphery of the hole.

The rotation shaft 220 is driven by the drive unit 230 to rotate around its central axis, which in turn rotates the phosphor member 100. The drive unit 230 is controlled by electric signals to rotationally move (rotate and stop) the circular, plate-like phosphor member 100 via the rotation shaft 220.

Structure of Light Source Device

Figure 4:
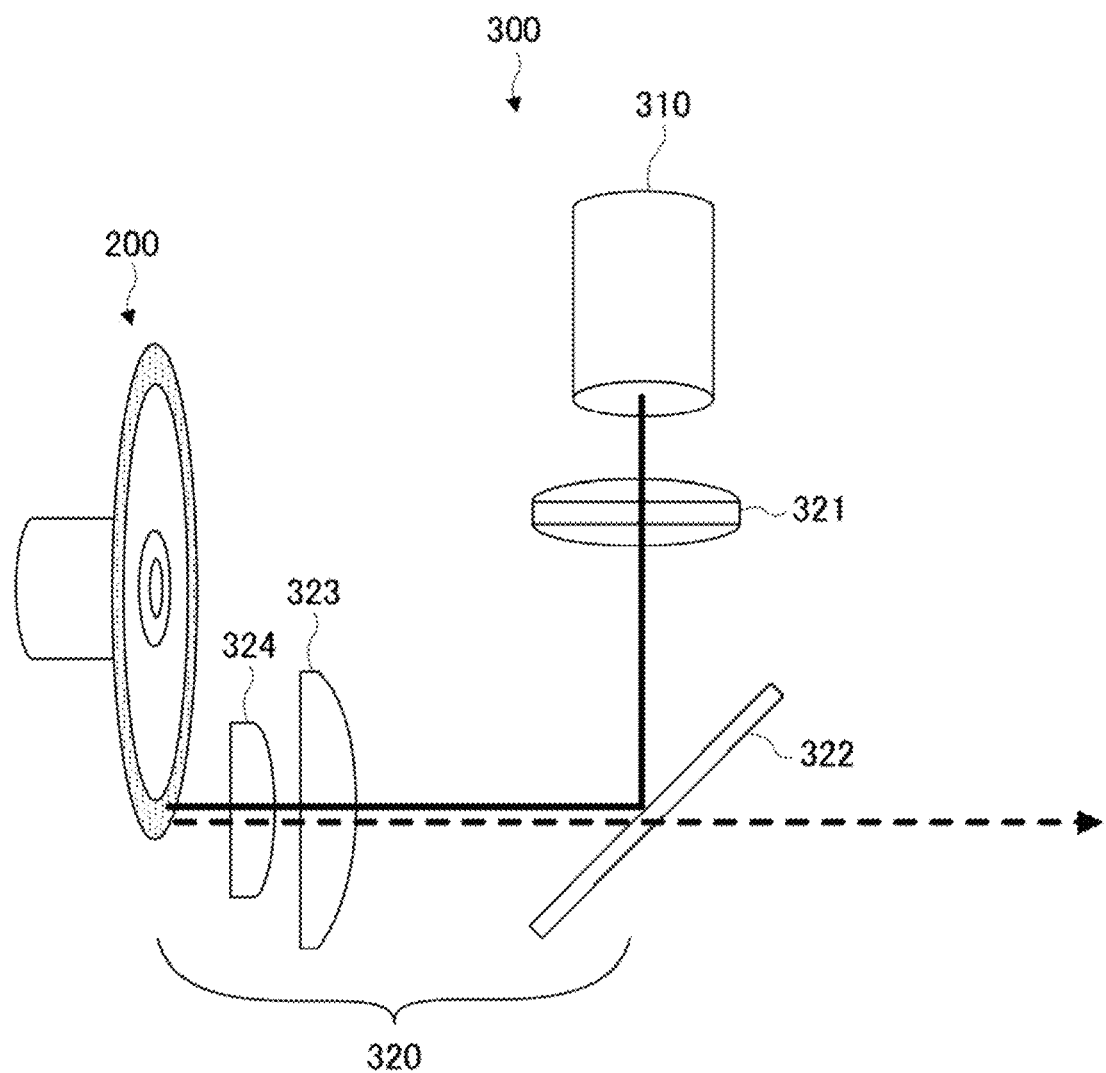
FIG. 4 is a schematic diagram of a light source device in accordance with the first embodiment.

FIG. 4 is a schematic diagram of a light source device 300. The light source device 300 includes a light source 310, an optical system 320, and the phosphor device 200. The light source device 300 is a combination of an excitation light source and an optical system that shines excitation light on the circumferential section of the wheel and extracts fluorescence. The light source 310 emits excitation light that causes fluorescence of the phosphor particles 111 in the phosphor layer 110. The excitation light source may be a blue laser diode (LD) or a like blue light source that excites phosphor particles such as YAG or LuAG.

In the example shown in FIG. 4, the optical system 320 includes a biconvex lens 321, a dichroic mirror 322, and planoconvex lenses 323, 324. The optical system 320 provides an incident-light system and an exit-light system. The incident-light system guides the emitted excitation light to the phosphor device 200. The dichroic mirror 322, for example, reflects blue light and transmits yellow and red light. The exit-light system hence outputs at least the fluorescence of the phosphor device 200.

The phosphor device 200 shown in FIG. 4 is of a reflection type. The phosphor layer 110 on the circular base member 120 preferably has on its bottom a high-reflection coating of, for example, silver, to increase the intensity of the fluorescence of the phosphor layer 110. Since the phosphor particles 111 and the binder 112 in the phosphor layer 110 of the phosphor device 200 have only a small difference in refractive index, the combination of a phosphor having a low Ce concentration and an alumina binder as the phosphor particles 111, which leads to only a small decrease in the fluorescence light-emitting efficiency of the phosphor (small thermal quenching) at high temperatures under high-intensity excitation light irradiation, can improve absorption of the excitation light by the phosphor particles 111 and improve external quantum efficiency for the fluorescence of the phosphor.

Structure of Projection Device

Figure 5:
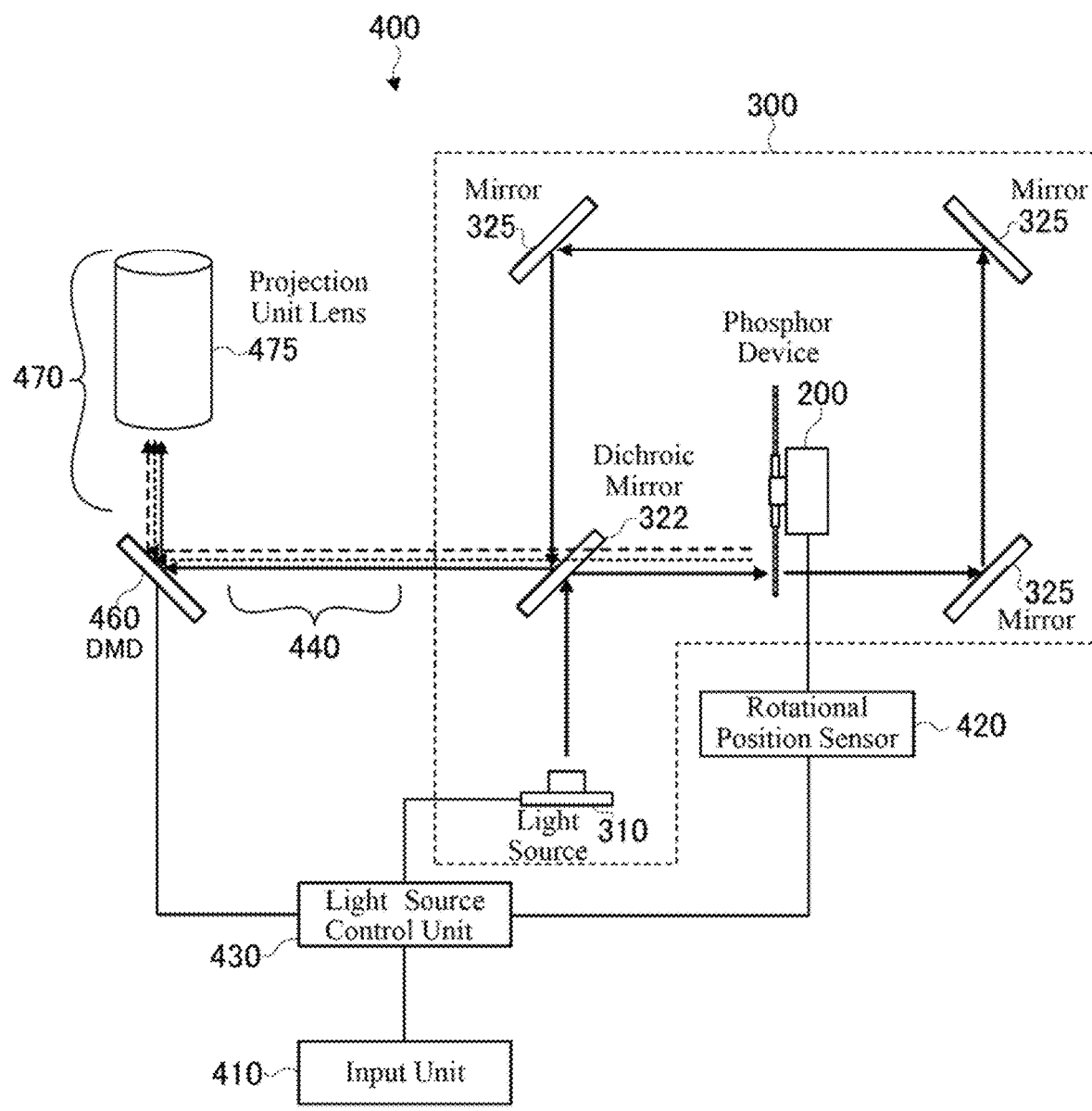
FIG. 5 is a schematic diagram of a projection device.

FIG. 5 is a schematic diagram of a projection device 400 (projector). The projection device 400 includes an input unit 410, a rotational position sensor 420, a light source control unit 430, the light source device 300, a light-guiding system 440, a display element 460, and a projection system 470.

The input unit 410 receives incoming data for images to be projected and supplies the data to the light source control unit 430. The input unit 410 may receive data from a device other than the projection device 400 and also may connect, for example, to the Internet to receive data over a communications network. The input unit 410 may alternatively receive inputs from a user. The rotational position sensor 420 detects the rotational position of the phosphor member 100.

The light source control unit 430 controls the excitation light output of the light source 310 in accordance with the rotational position of the phosphor member 100 in response to an input of the intensity of projected light. The control of the excitation light enables any changes in intensity of the light emitted by the phosphor member 100.

The control of the excitation light output in accordance with colors and brightness levels can restrain degradation of the light source 310 and the phosphor member 100. The internal heating of the projection device 400 can be restrained because there is no need to attenuate unwanted light. The light source control unit 430 also controls to output inputted image data to the display element 460. The light source control unit 430 is also capable of controlling the optical system. A projection unit lens 475 is partially movable, for example, by an electric motor so as to zoom in/out, focus, and make other adjustments under the control of the light source control unit 430.

The light source device 300 includes the light source 310, the phosphor device 200, and an optical system. The optical system includes the dichroic mirror 322 and mirrors 325. The phosphor device 200 shown in FIG. 5 is of a transmission type. The blue light from the light source reflects off the dichroic mirror 322, enters the phosphor device 200, reflects off the three mirrors 325 and the dichroic mirror 322, and enters the display element 460. Yellow and red fluorescence from the phosphor device 200 passes through the dichroic mirror 322 and enters the display element 460.

The light-guiding system 440 guides emission light from the light source device 300 to the display element 460. The display element 460 processes inputted image data for projection, outputs the processed data, and displays images using the emission light guided by the light-guiding system 440. The display element 460 is, for example, a DMD (digital micromirror device). The projection system 470 externally projects the image displayed by the display element 460. The projection system 470 includes the projection unit lens 475. The projection system 470 may include a plurality of lenses or mirrors. The structure described in the present embodiment is a mere example; each optical system may include various lenses and mirrors depending on its applications.

High illuminance is required to produce a high-quality projection display without being easily affected by external light. To achieve high-illuminance projection by increasing the light emitted by the light source, light sources have started to be used that combine high-density excitation light and fluorescence. The use of the projection device 400 enables maintaining high levels of projection illuminance, thereby producing high-quality projection images even in the presence of external light. The high-luminance projection device 400 can be thus realized.

Method of Manufacturing Phosphor Member

Figure 6A:
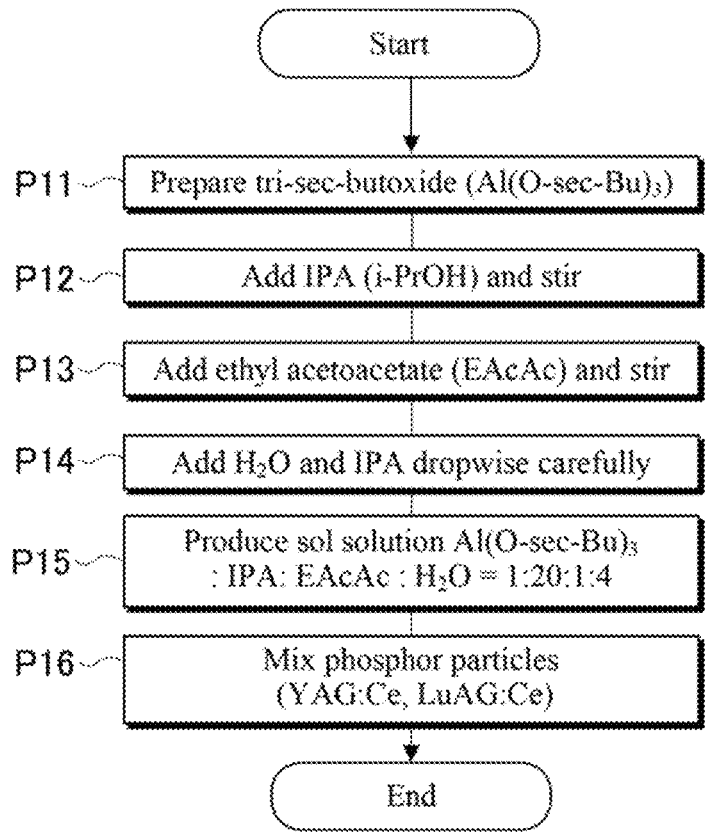
FIG. 6A is a flow chart representing steps of manufacturing a sol solution.
Figure 6B:
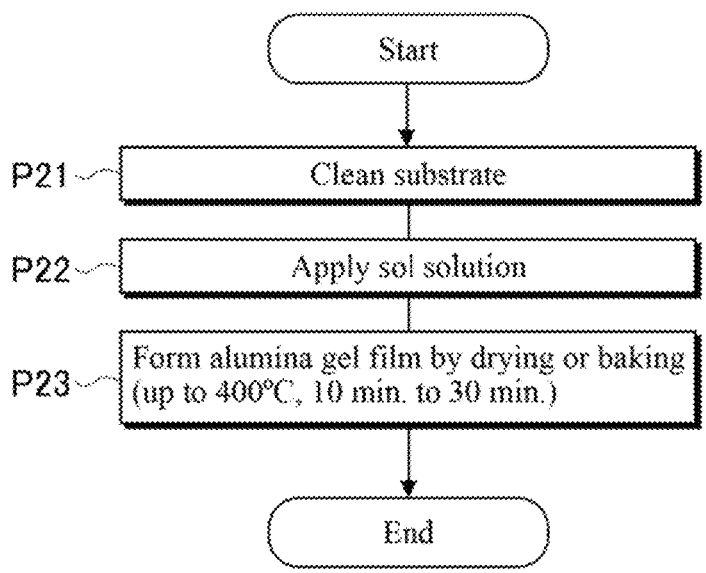
FIG. 6B is a flow chart representing steps of forming a phosphor layer.

Next will be described an exemplary method of manufacturing the phosphor member 100. The phosphor member 100 can be fabricated by treating a sol on a base member. FIGS. 6A and 6B are flow charts respectively representing steps of manufacturing a sol solution and steps of forming a phosphor layer.

Referring to FIG. 6A, first, to produce a sol solution of alumina that will be a binder, tri-sec-butoxide ($Al(O-sec-Bu)_3$) is prepared (step P11). IPA (i-PrOH) is then added to this, and the resultant mixture is stirred at room temperature for approximately 1 hour (step P12). A chelating agent ethyl acetoacetate (EAcAc) is also added, and the resultant mixture is stirred for approximately 3 hours (step P13). $H_2O$ and IPA are then carefully added dropwise (step P14), which completes the production of a sol solution of alumina that will be a binder. The ratio of the components is, for example, $Al(O-sec-Bu)_3:IPA:EAcAc:H_2O=1:20:1:4$ (step P15). The produced sol solution is mixed with phosphor particles (YAG:Ce, LuAG:Ce) (step P16), which completes the production of a sol solution of a phosphor layer composition that is a mixture of a binder and phosphor particles.

A description will be now given of steps of forming a phosphor layer containing a phosphor in an alumina gel by forming on a substrate a film of the phosphor layer composition that is a mixture of phosphor particles and a binder and then drying or baking the entire substrate to remove the solvent.

Referring to FIG. 6B, a substrate is first washed before application of the phosphor layer composition (step P21). The phosphor layer composition is applied to the surface of the washed substrate. If the substrate is shaped like a wheel, the phosphor layer composition is applied along its circumference (step P22). The phosphor layer composition may be applied using a dispenser or by screen printing. As alternative examples, the phosphor layer composition may be applied using a bar coater or by spray or inkjet technology. If there is no specific need for patterning, dipping is preferred for its high efficiency where the washed substrate is immersed in a sol solution.

Following the application of the sol solution, the gel solution is dried or baked for gelation, forming a phosphor layer in which the phosphor is dispersed in the alumina gel binder. For instance, the gel solution is baked (400° C., 10 min. to 30 min.) to form an alumina ($Al_2O_3$) gel film (step P23). The phosphor member 100 thus obtained can restrain interfacial reflection and influence of scattering. The combination of a phosphor having a low impurity concentration with low excitation-light absorption and an alumina binder can improve absorption of light by the phosphor particles.

The examples described so far assume use of aluminum alkoxide. The phosphor layer can be provided by a similar process when another metal alkoxide is used. In short, a sol solution is prepared, applied to the base member, and dried or baked.

Second Embodiment

Structure of Phosphor Member

Figure 7:
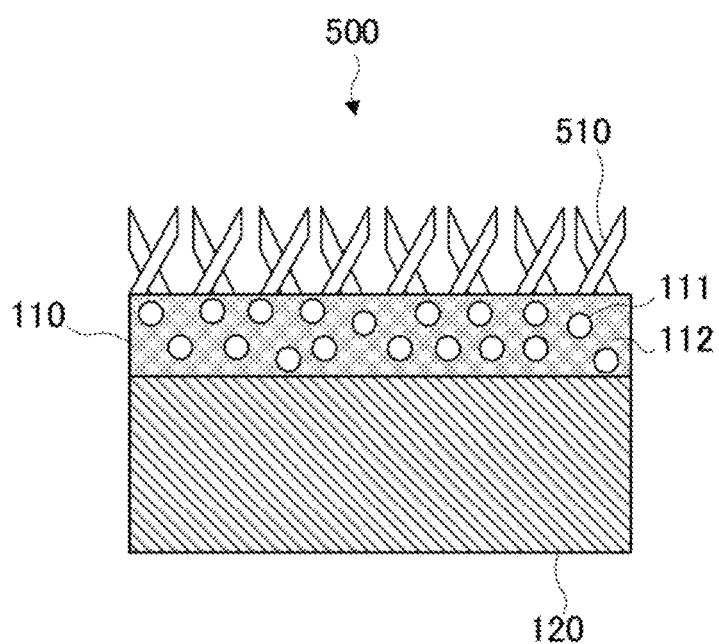
FIG. 7 is a cross-sectional view of a phosphor member in accordance with a second embodiment.

In the previous embodiment, the difference in refractive index is small at those interfaces between the phosphor particles 111 and the binder 112, but large at the interface between the binder 112 and the air. The difference in refractive index at the interface between the binder 112 and the air (n=1.0) filling spaces causes scattering of light, thereby becoming a cause for reducing the excitation light incident to the phosphor particles 111. FIG. 7 is a cross-sectional view of a phosphor member 500.

The phosphor member 500 includes the phosphor layer 110, the base member 120, and an antireflective layer 510. The antireflective layer 510 is provided on the phosphor layer 110 in the form of a fine irregular structure composed of a hydrate of a metal oxide gel film constituting the binder 112. The provision of the antireflective layer 510 reduces the difference in refractive index between the phosphor layer 110 and the air and restrains reflection at the interfaces between the phosphor layer 110 and the air, thereby improving irradiation with excitation light and fluorescence extraction efficiency between the phosphor layer 110 and the air.

When the binder 112 is composed of a translucent alumina gel of a metal alkoxide or a mixture of a metal alkoxide and a metal oxide, flower-like aluminum may be used as the antireflective layer 510. The use of the material with such a surface structure can improve irradiation with excitation light and fluorescence extraction on the surface of the phosphor layer 110.

The provision of a fine structure as an antireflective film and the combination of a phosphor and a fine irregular structure can improve light absorption by the phosphor particles and efficiently produce fluorescence. The combination not only with a fluorescence material that has a normal impurity concentration, but also with a fluorescence material that has a low impurity concentration with only a small decrease in efficiency even at high temperatures enables the provision of a phosphor layer and a light-emitting device that exhibit only a small decrease in efficiency at elevated temperatures under high-intensity excitation light irradiation, for example, by a laser light source.

Method of Manufacturing Phosphor Member

Figure 8:
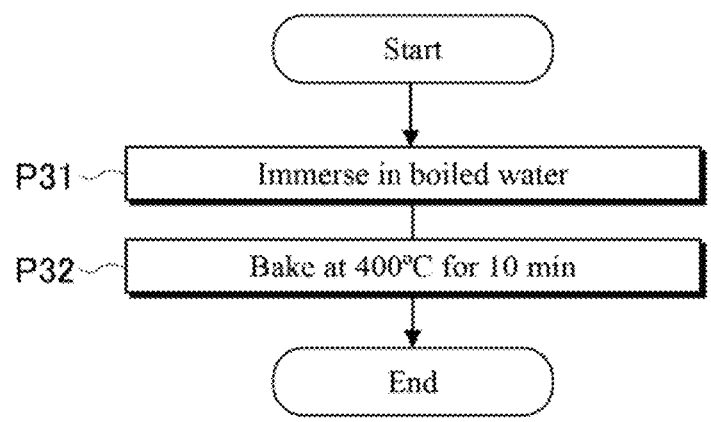
FIG. 8 is a flow chart representing steps of forming a fine irregular structure.

Next will be described an exemplary method of manufacturing the phosphor member 500 including the antireflective layer 510. FIG. 8 is a flow chart representing steps of forming a fine irregular structure. A phosphor member is first prepared where the binder is composed of a translucent alumina gel containing a metal alkoxide or a mixture of a metal alkoxide and a metal oxide.

Referring to FIG. 8, a phosphor layer containing an alumina gel as a binder is immersed in boiled water and boiled (immersed in warm water, 60° C. to 100° C.) (step P31). The alumina binder on the surface of the phosphor layer forms an alumina hydrate (boehmite). The phosphor member obtained by the immersion is baked at 400° C. for 10 minutes (step P32), which completes the provision of a fine irregular structure called "flower-like aluminum (flower-like $Al_2O_3$)" on the phosphor layer.

Third Embodiment

In the previous embodiments, a single phosphor layer is provided along the circumference of the phosphor member. As an alternative, a plurality of different phosphor layers or a transmitting portion may be provided for each plurality of segments. "Different" phosphor layers means that the phosphor layers fluoresce at different wavelengths under the same excitation light. The transmitting portions, throughout the rest of the specification, may be replaced by reflective portions when the phosphor device is of a reflection type.

Figure 9A:
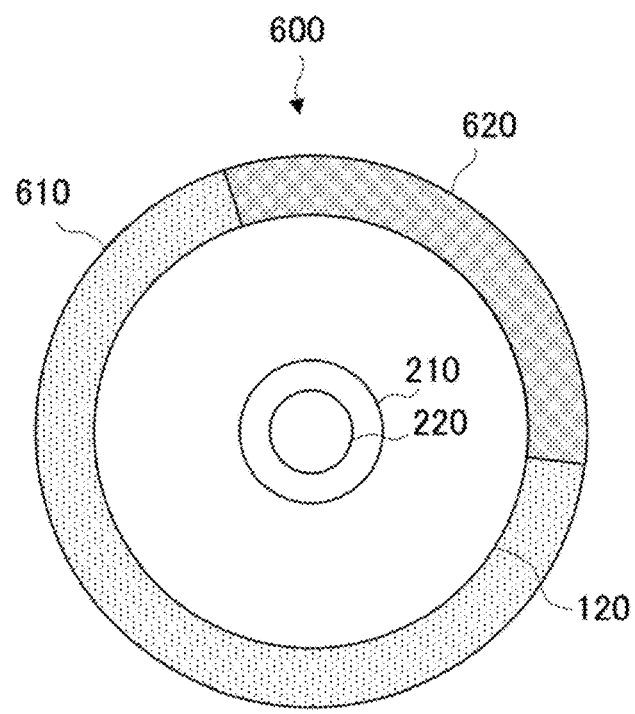
FIG. 9A is a front view of a phosphor member in accordance with a third embodiment.
Figure 9B:
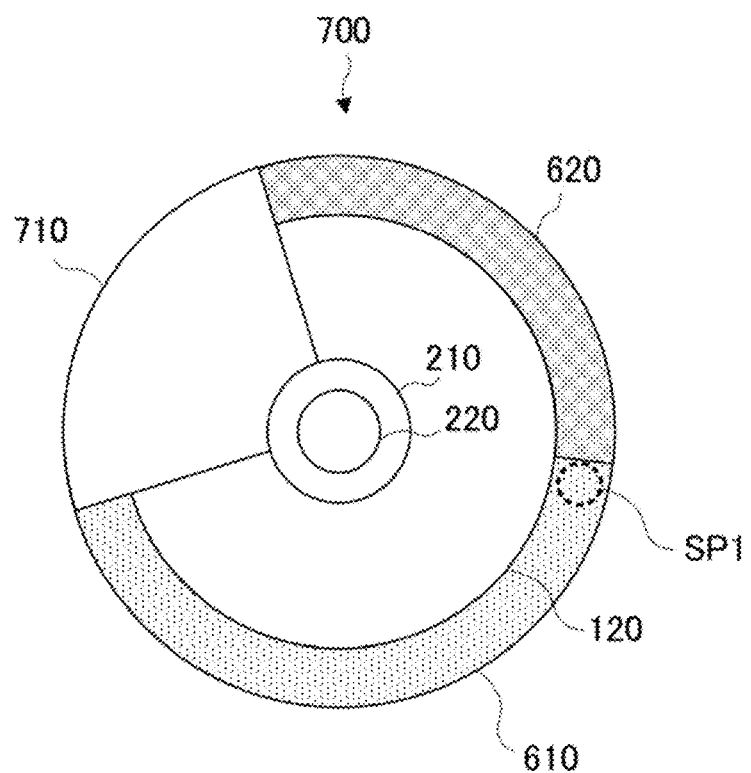
FIG. 9B is a front view of a phosphor member in accordance with the third embodiment.

FIGS. 9A and 9B are front views of phosphor members 600 and 700 respectively. Referring to FIG. 9A, the phosphor member 600 is divided into two segments along the circumference. There are provided a phosphor layer 610 in one of the segments and a phosphor layer 620 in the other segment. The phosphor layers 610 and 620 have different functions. For instance, if the phosphor particles 111 are yellow in the phosphor layer 610 and red in the phosphor layer 620, light of different colors can be extracted depending on the rotational position of the phosphor member 600.

Referring to FIG. 9B, the phosphor member 700 is divided into three segments along the circumference. The phosphor layers 610 and 620 are provided respectively in two of the three segments, and a transmitting portion 710 is provided in the other segment. The transmitting portion 710 transmits incoming light. The phosphor member 700 is preferably made of glass or another transparent base member 120. In the example shown in FIG. 9B, the phosphor member 700 is under excitation light that forms an excitation-light spot SP1 thereon. Resultant fluorescence is yellow under these conditions. When the phosphor member 700 is rotated, for example, so that the excitation-light spot SP1 is on the phosphor layer 620, the fluorescence is red.

In the phosphor members 600 and 700, there is provided a phosphor layer in at least one of different segment regions into which the region on the base member 120 is divided along the circumference as described here. Different light can be extracted from different segment regions under the same excitation light. In other words, different light can be extracted depending on which segment region is placed under excitation light.

Figure 10:
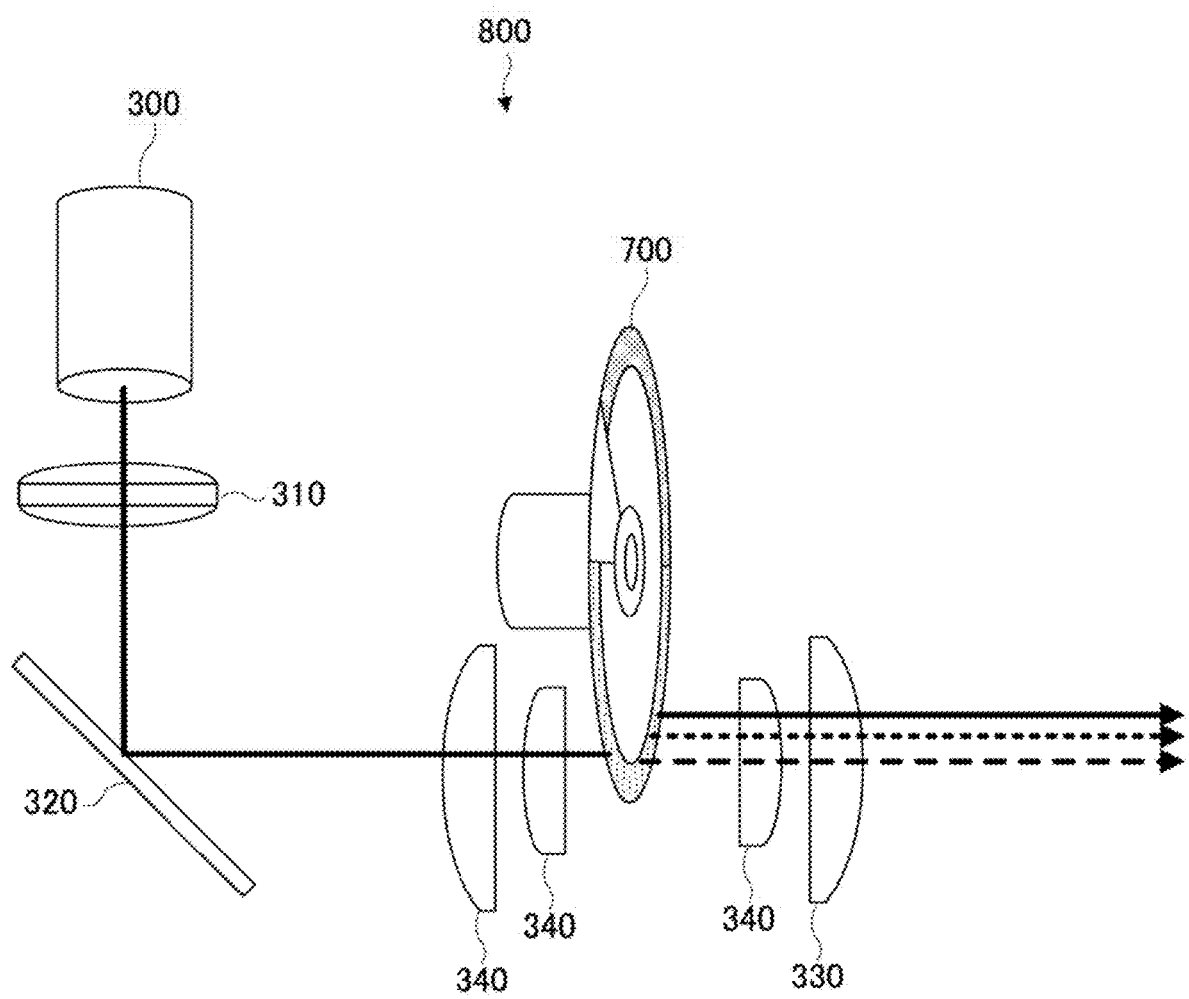
FIG. 10 is a schematic diagram of a light source device in accordance with the third embodiment.

FIG. 10 is a schematic diagram of a transmission-type light source device 800 including the phosphor member 700. Using this light source device 800 in the projection device 400 enables the colors and brightness levels of output projection images to be controlled by changing the rotational position of the phosphor member.

Fourth Embodiment

Figure 11A:
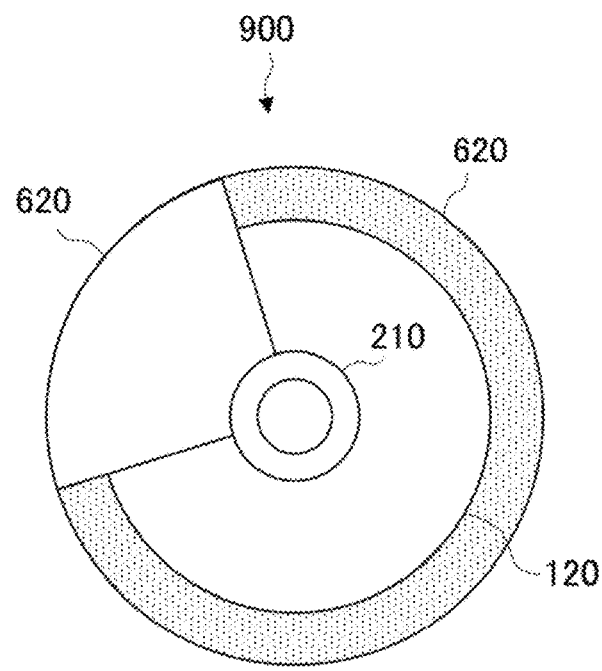
FIG. 11A is a front view of a phosphor member in accordance with a fourth embodiment.
Figure 11B:
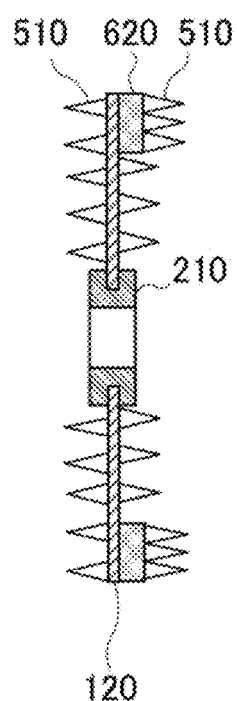
FIG. 11B is a cross-sectional view of a phosphor member in accordance with the fourth embodiment.

A fine irregular structure may be formed on the surface of a phosphor member by first forming a phosphor layer in each of the circumferentially segmented regions and then immersing the phosphor member in a sol solution of alumina containing no phosphor particles. FIGS. 11A and 11B are a front view and a cross-sectional view respectively of a phosphor member 900. In this case, a fine irregular structure 510 can be formed on the front and back surfaces of a phosphor member by first forming an alumina gel film on both the front and back surfaces of the phosphor member 900 and then treating the phosphor members in warm water. This structure can restrain the interfacial reflection of the excitation light irradiating the back surface of the phosphor member and the fluorescence and excitation light leaving the front surface of the phosphor member, which as a result increases the external quantum efficiency of the phosphor member 900.

The phosphor layer 620 of the transmission-type phosphor member 900 is preferably made of phosphor particles and an alumina gel as an inorganic binder. The fine irregular structure 510 is formed of flower-like aluminum (flower-like $Al_2O_3$) on both the light-incident surface and the fluorescence-exit surface of the transmission-type phosphor member 900.

Examples

Figure 12:
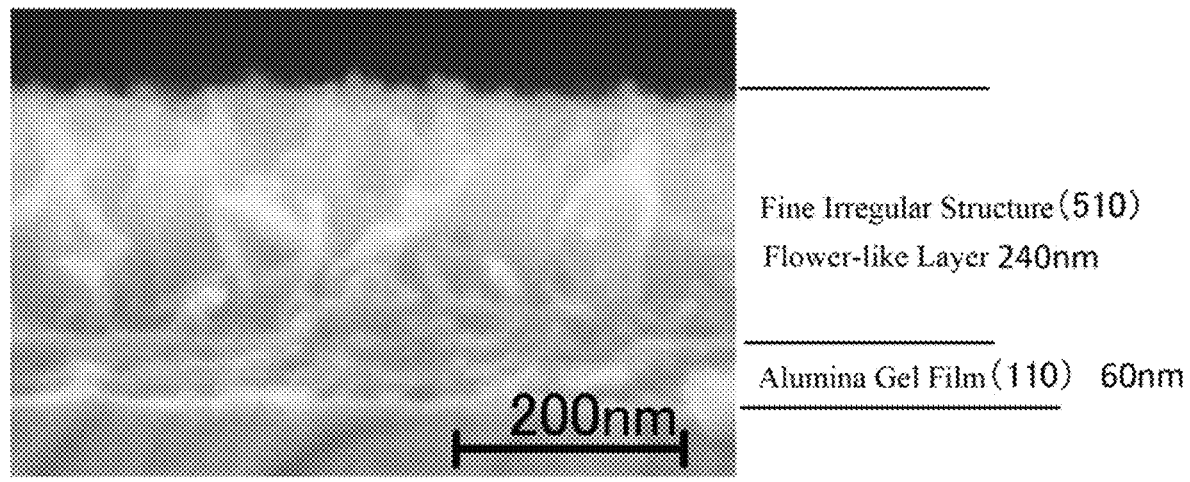
FIG. 12 is an SEM photograph of a cross-section of a fine irregular structure.

A fine irregular structure was formed of flower-like aluminum (flower-like $Al_2O_3$) by the manufacturing method detailed above. FIG. 12 is an SEM photograph of a cross-section of the fine irregular structure. The SEM photograph verifies that the aforementioned treatment of the alumina gel film on the phosphor layer in warm water formed the fine irregular structure 510 of thin boehmite crystals (thickness: 240 nm) on the underlying alumina gel film 110.

Figure 13A:
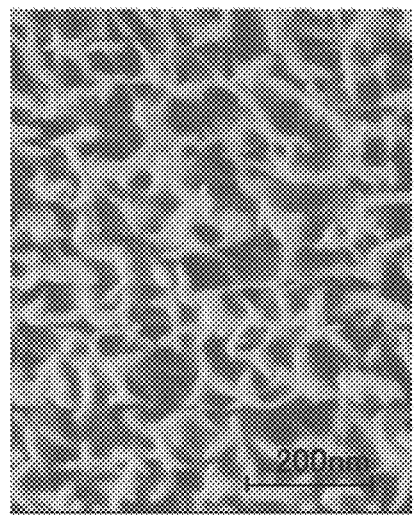
FIG. 13A is an SEM photograph of a surface of a phosphor layer.
Figure 13B:
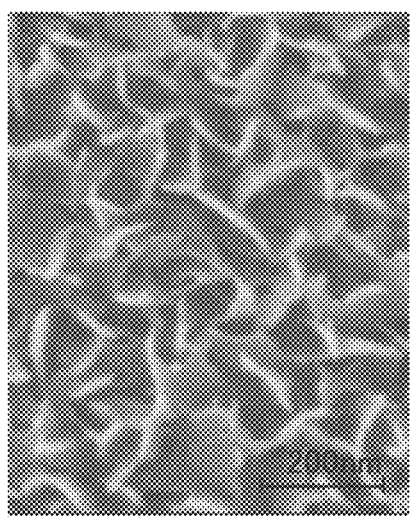
FIG. 13B is an SEM photograph of a surface of a phosphor layer.
Figure 14:
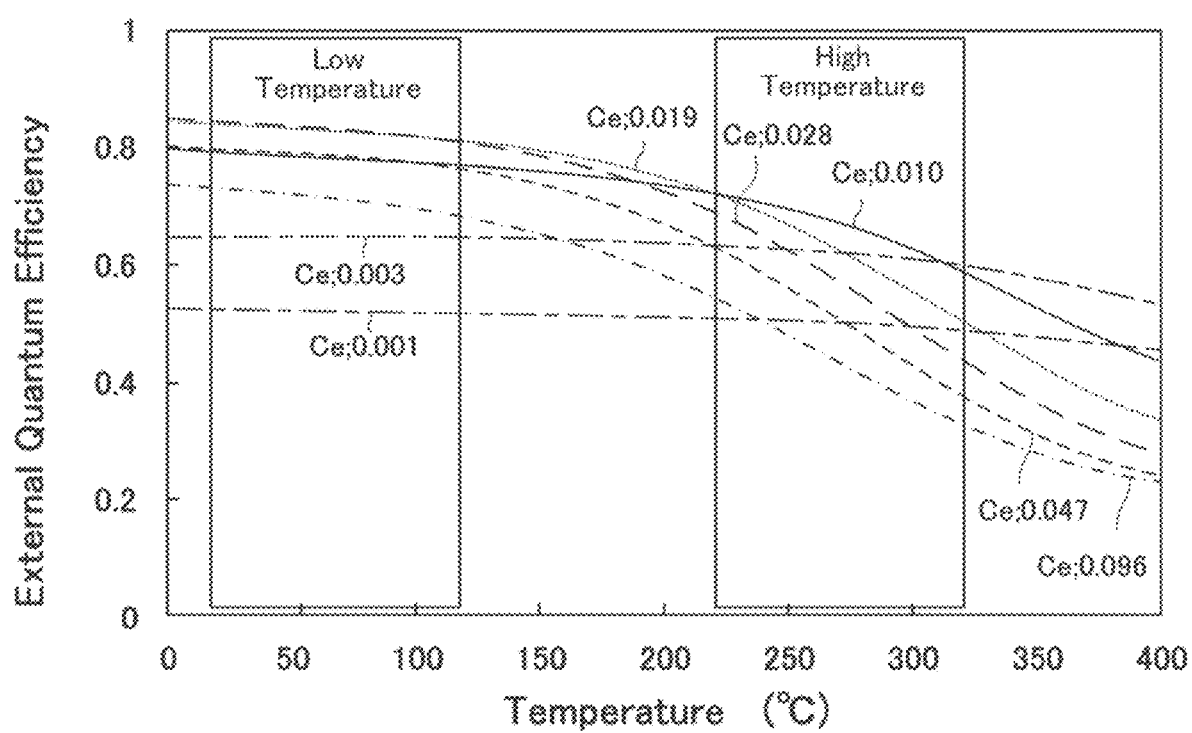
FIG. 14 is a graph representing a relationship between the temperature and external quantum efficiency of a phosphor for various concentrations of a luminescence-center element.

FIGS. 13(a) and 13(b) are SEM photographs of surfaces of phosphor layers. The surfaces were observed to find out whether or not there occurred any difference between baked and non-baked samples after immersing the phosphor members in boiled water. The surfaces had different shapes: the baked surface had a finer irregular structure than did the non-baked surface. The SEM photographs verify that the fine irregular structures reduced surface reflection on both the baked and non-baked surfaces.

The present international application claims the benefit of priority to Japanese Patent Application, Tokugan, No. 2017-129900 filed on Jun. 30, 2017, the entire contents of which are incorporated herein by reference.

REFERENCE SIGNS LIST 100, 500, 600, 700, 900 Phosphor Member
110, 610, 620 Phosphor Layer (Alumina Gel Film)
111 Phosphor Particle
112 Binder
120 Base Member
200 Phosphor Device
210 Fixing Member
220 Rotation Shaft
230 Drive Unit
300, 800 Light Source Device
310 Light Source
321 Biconvex Lens
320 Optical System
322 Dichroic Mirror
325 Mirror
330 Planoconvex Lens
400 Projection Device
410 Input Unit
420 Rotational Position Sensor
430 Light Source Control Unit
440 Light-guiding System
460 Display Element
470 Projection System
475 Projection Unit Lens
510 Antireflective Layer (Fine Irregular Structure)
710 Transmitting Portion
e1 Excitation Light
f1 Fluorescence
r1 Region
SP1 Excitation-light Spot

The invention claimed is:

1. A phosphor member comprising:
a phosphor layer containing phosphor particles absorbing excitation light and emitting prescribed fluorescence; a binder composed of a translucent gel containing a metal alkoxide or a mixture of a metal alkoxide and a metal oxide, the phosphor particles being dispersed in the binder; and
a base member having a surface on which the phosphor layer is provided, wherein
the binder includes a translucent gel containing a metal alkoxide or a mixture of a metal alkoxide and a metal oxide, the metal primarily including any of aluminum, tin, and zinc,
the phosphor particles have a general formula of $(RE_{1-x}Ce_x)_3Al_5O_{12}$, where RE includes at least one element selected from the group consisting of rare-earth elements, and x is a concentration of a luminescence-center element Ce to the rare-earth element RE and is from 0, exclusive, to 0.03, inclusive, and
the phosphor particles and the binder differ in refractive index by 0.3 or less.

2. The phosphor member according to claim 1 further comprising an antireflective layer on the phosphor layer, the antireflective layer having a fine irregular structure composed of a hydrate of the metal oxide.

3. The phosphor member according to claim 1, wherein the base member is shaped like a circular plate, the base member having thereon a region divided in a circumferential direction into a plurality of different segment regions,
the phosphor layer is provided at least in one of the segment regions, and
the segment regions emit different light under identical excitation light.

4. A projection device comprising:
a light source device including:
a light source configured to emit excitation light;
an incident-light system configured to guide the emitted excitation light;
the phosphor member according to claim 3 configured to emit fluorescence under the guided excitation light; and an exit-light system configured to condense the fluorescence emitted by the phosphor member;
a drive unit configured to rotationally move the phosphor member;
a rotational position sensor configured to acquire a rotational position of the phosphor member;
a control unit configured to control an excitation light output in accordance with the acquired rotational position of the phosphor member;
a light-guiding system configured to guide emission light from the light source device;
a display element configured to produce a display using the emission light guided by the light-guiding system; and
a projection system configured to project the display.

5. The phosphor member according to claim 1, wherein the binder is composed of a gel primarily containing aluminum alkoxide or a mixture of aluminum alkoxide and alumina.

6. The phosphor member according to claim 5 further comprising an antireflective layer on the phosphor layer, the antireflective layer having a fine irregular structure composed of a hydrate of the alumina.

7. The phosphor member according to claim 6, wherein the excitation light is projected onto the phosphor particles via the antireflective layer.

8. The phosphor member according to claim 2, wherein the excitation light is projected onto the phosphor particles via the antireflective layer.

* * * * *